United States Patent
Foglia et al.

(10) Patent No.: US 10,028,060 B2
(45) Date of Patent: Jul. 17, 2018

(54) TEMPERATURE STABLE MEMBRANE PLATE STRUCTURE FOR A LOUDSPEAKER

(71) Applicant: 4A MANUFACTURING GMBH, Traboch (AT)

(72) Inventors: Domenica Foglia, Vienna (AT); Michael Pichler, Kobenz (AT); Reinhard Hafellner, Spielberg (AT)

(73) Assignee: 4A Manufacturing GmbH, Traboch (AT)

( * ) Notice: Subject to any disclaimer, the term of this patent is extended or adjusted under 35 U.S.C. 154(b) by 0 days.

(21) Appl. No.: 15/243,505

(22) Filed: Aug. 22, 2016

(65) Prior Publication Data
US 2018/0054677 A1    Feb. 22, 2018

(51) Int. Cl.
*H04R 7/10* (2006.01)
*H04R 7/12* (2006.01)
*B32B 7/12* (2006.01)
*B32B 5/18* (2006.01)

(52) U.S. Cl.
CPC .............. *H04R 7/122* (2013.01); *B32B 5/18* (2013.01); *B32B 7/12* (2013.01); *B32B 2305/022* (2013.01); *B32B 2307/10* (2013.01); *B32B 2307/308* (2013.01); *H04R 2499/11* (2013.01)

(58) Field of Classification Search
CPC . H04R 7/04; H04R 7/045; H04R 7/06; H04R 7/10; H04R 7/122; H04R 2499/11
USPC ........ 181/168, 169, 170; 381/426, 427, 428, 381/431
See application file for complete search history.

(56) References Cited

U.S. PATENT DOCUMENTS

| 4,517,416 | A | * | 5/1985 | Goossens | H04R 7/02 181/144 |
| 6,097,829 | A | * | 8/2000 | Guenther | H04R 7/06 181/169 |
| 6,332,029 | B1 | * | 12/2001 | Azima | B42D 15/022 181/166 |
| 6,694,038 | B1 | * | 2/2004 | Azima | H04R 1/24 381/152 |
| 9,485,581 | B2 | * | 11/2016 | Huang | H04R 7/02 |
| 2002/0146145 | A1 | * | 10/2002 | James | H04R 9/046 381/426 |

(Continued)

FOREIGN PATENT DOCUMENTS

CN    204797266    3/2015

*Primary Examiner* — Jeremy Luks
(74) *Attorney, Agent, or Firm* — E. Victor Indiano; Indiano & McConnell, LLC

(57) ABSTRACT

The present invention relates to a membrane plate structure for generating sound waves. The membrane plate structure comprises a first skin layer, a second skin layer, a foam core layer which is interposed between the first skin layer and the second skin layer, and two binding layers. At least one of the first skin layer and the second skin layer is attachable to a vibrating element for generating sound waves. The elastic modulus of the core layer and its density are lower than the elastic modulus and the density of the first skin layer and the second skin layer, so that a sandwich structure is achieved. The Young modulus and the shear modulus of first skin layer, the second skin layer, the core layer and the binding layers are not variating between each other of more than 30% between a temperature 20° C. and 150° C., particularly between 20° C. and 170° C., more particularly 20° C. and 180° C.

8 Claims, 2 Drawing Sheets

(56) References Cited

U.S. PATENT DOCUMENTS

| | | | |
|---|---|---|---|
| 2004/0247152 A1* | 12/2004 | Greb | H04R 7/125 381/423 |
| 2010/0135519 A1* | 6/2010 | Werners | G10K 9/12 381/398 |
| 2011/0272208 A1* | 11/2011 | Shen | H04R 7/10 181/170 |
| 2011/0299716 A1* | 12/2011 | Reckert | H04R 7/02 381/398 |
| 2013/0016874 A1 | 1/2013 | Huang et al. | |
| 2015/0181340 A1 | 6/2015 | Noda | |
| 2016/0309260 A1* | 10/2016 | Bohm | H04R 7/10 |

* cited by examiner

TEMPERATURE STABLE MEMBRANE PLATE STRUCTURE FOR A LOUDSPEAKER

FIELD OF INVENTION

The present invention relates to a membrane plate structure for generating sound waves, to a loudspeaker comprising the membrane plate structure, to a handheld device, and to a method of manufacturing a membrane plate structure.

BACKGROUND

Loudspeaker, in particular in micro-speakers for portable devices (mobile phones), and more in particular receiver micro-speaker (also called ear-pieces, responsible for the voice sound-transmission), need thinner elements in order to reduce the overall size of the loudspeaker. In general, a loudspeaker comprises a diaphragm which is excited by a coil or another vibrating element.

In US 2013/0016874 A1 for example this function is represented by the element 121 of a diaphragm 12 which guarantees high break-up frequency and low weight. This element is often called membrane plate, to be distinguished from the surround (connecting area 123) which is often called membrane. The characteristics required by a membrane plate are:

a. High material resonance frequency—to guarantee a linearity and the absence of acoustic peaks in the hearable region
b. Low weight—to reduce the moved mass and consequently increase the sound pressure level and the efficiency of the speaker
c. High temperature resistance—to guarantee the same mechanical stiffness at higher working temperatures The resonance frequency of a material is directly proportional to its length and width and a figure of merit, here defined "Frequency Factor". The frequency factor is defined as follow:

$$d\sqrt{\frac{B}{\rho}}$$

Where d, is the total thickness, B is the bending module, and $\rho$ is the density of the membrane plate material. The square root is also the speed of sound of the material.

In micro-speakers, due to very small available thickness, the membrane plates are generally designed with a total thickness lower than 500 µm.

For these applications, due to the low available thickness, in order to achieve high frequency factors, it is necessary to utilize high mechanical performance materials. Sandwich constructions represent a solution for this application, since they offer a proper ratio of bending module to weight (see also "An Introduction to Sandwich Construction", Zenkert, D., 1995, Engineering Materials Advisory Services Ltd).

In micro-speaker applications, the actual state of the art is disclosed for example in CN 204707266 U.

SUMMARY OF THE INVENTION

There may be a need to provide a component for a loudspeaker with very small space requirements and a high temperature resistance or stability.

According to an embodiment of the present invention, a membrane structure for generating sound waves is presented. The membrane plate structure comprises a first skin layer, a second skin layer, a foam core layer which is interposed between the first skin layer and the second skin layer and two binding layers interposed between the two skin layers and the core layer. For example, one of the skin layers is e.g. attachable to a coil or another vibrating element for generating sound waves.

According to an embodiment of the present invention, the Young modulus and the density of the core layer are lower than the Young modulus and the density of the first membrane skin layer and the second membrane skin layer, wherein the Young modulus and the shear modulus of all the layers is not decreasing by more than 30% between 20° and 150° C., preferably between 20° C. and 170° C., mostly preferably 20° C. and 180° C. In other words, the Young modulus and the shear modulus of first skin layer, the second skin layer, the core layer and the binding layers may be configured to not reduce their value of the Young modulus and the shear modulus of more than 30% between a temperature of 20° C. and 150° C.

According to another embodiment of the present invention, a micro speaker (in particular for a handheld device) is provided which comprises a membrane plate structure having the above mentioned features.

According to still another embodiment of the present invention, a handheld device (in particular a mobile phone) is provided which comprises at least one of a membrane plate structure having the above mentioned features and a micro speaker having the above mentioned features.

According to yet another embodiment of the present invention, a method of producing a membrane plate structure is provided, wherein the method comprises providing a first skin layer, providing a second skin layer, interposing a foam core layer between the first skin layer and the second skin layer, and arranging two binding layers between the foam core layer and the skin layers. At least one of the first skin layer and the second skin layer may be configured to be coupled to a vibrating element for generating sound waves, the Young modulus of the core layer may be configured to be lower than the Young modulus of the first skin layer and the second skin layer, the density of at least one of the first skin layer and the second skin layer may be configured to be higher than the density of the core layer, and the Young modulus and the shear modulus of the first skin layer, the second skin layer, the core layer and the binding layers may be configured to change their value by not more than 30% between a temperature of 20° C. and 150° C.

DESCRIPTION OF FURTHER EXEMPLARY EMBODIMENTS

According to a further embodiment of the present invention, the first skin layer, the second skin layer, the binding layers and the core layer form a stack having a curved, in particular wavelike, or dish (trapezoid) like, or dome like, or conus like extension. In other words, the membrane plate structure comprises a curved, wavelike, or dished (trapezoid) like, or dome like or conus like structure and does not only extend within a plane. By the term "curved extension" it is meant in particular, that the mentioned layers extend not completely within a plane. For example, a center of a layer is arranged within a first plane and an edge portion of the layer is arranged outside of the first plane (in particular within a second plane which is spaced apart from the first plane).

According to a further embodiment of the present invention, the shape is realized with a forming procedure after the production of the sandwich, through the use of a cold or warm stamping process performed in a temperature range between 0° C. and 200° C., or a pressure forming process performed in a temperature range performed between 0° C. and 200° C. Modern micro-speakers may use higher output power (1-3, 5 W) to increase the loudness of the speaker. This power may cause very high coil temperatures, which are also conveyed to mechanically relevant parts such as the membrane (or surround) and the membrane plate (or diaphragm). Such temperatures can exceed 140° C.-150° C., up to 180° C.

Moreover, to achieve louder micro-speakers it may be necessary to reduce the moved mass, and a way to increase the stiffness to weight ratio of the diaphragm is to use a non planar geometry. Specifically, this is advantageous for sandwich materials, especially with a sandwich with aluminum as skin layer which may be used according to an embodiment of the present invention.

By an embodiment of the present invention, the described sandwich material is usable in a micro-speaker and fulfills the requirements in particular regarding stiffness to weight ratio and heat resistance. In fact, by the described sandwich material its mechanical properties may be maintained at temperatures up to e.g. 180° C. as at ambient temperature and the material can be plastically formed into a non-planar geometry.

Advantages of using a high temperature-stable and plastic-formable material are:
  Possibility of creating diaphragms with high break-up frequency and total weight lower than 150 g/m$^2$
  Possibility to create materials with high temperature mechanical stability (high HDT and flat DMA curves), and consequently the possibility to obtain the same frequency response at cold state and after some minutes of music reproduction (warm speaker).
  Very easy, cheap and precise forming manufacturing (ex stamping), suitable for mass-production.

As mentioned above, the micro speaker may be used within a handheld device, such as a tablet PC, smartphone, notebook computer and/or ear phones.

The micro speaker comprises for example a carrier element, a coil which is coupled to the carrier element by meaning of so-called surround or membrane and a membrane plate structure coupled with the coil for generating sound waves.

According to an exemplary embodiment, a choice of ductile materials as skin layer and core layers may be made which allows the sandwich to be plastically formable or deformable (e.g. by cold and warm forming). Such materials are ideally metals foils (especially aluminum) for skin layers and thermoplastic material as binding layer and core layers.

According to an exemplary embodiment, the core layer is a polymeric foam like, but not only limited to, PMI (Polymethacrylimide) foam, polyester foams, polyurethane foams, polysulfone or polyethersulfone based foams, polyphenilene-sulfide foams, etc.

According to an exemplary embodiment, the first membrane skin layer and/or the second skin layer is made of metal foil or aluminum foil, with a thickness equal or lower than 15 μm (Micrometer) per layer.

According to an exemplary embodiment, the binding or bonding layers are made of a thermoplastic material like polyolefins, polyesters, polyamides, silicones.

According to an exemplary embodiment, the bonding layers are made of an elastomer material like polyacrylates, rubbers etc. In this case, an advantage would be to achieve higher damping factors at costs of lower bending stiffness.

According to an exemplary embodiment, the bonding layers are made of a thermoset material, like epoxy resins, polyester resins, polyurethans, polyimides.

According to an exemplary embodiment, the first skin layer, the second skin layer and the core layer form a stack having an area density lower than 150 g/m$^2$.

According to an exemplary embodiment, the first skin layer, the second skin layer and the core layer form a stack having a total thickness lower than 500 μm.

According to an exemplary embodiment, the first skin layer, the second skin layer and the core layer form a stack having a bending modulus higher than 5 GPa, in particular more than 10 GPa, further in particular more than 15 GPa.

According to an exemplary embodiment, the first skin layer, the second skin layer and the core layer form a non-planar structure having a total depth of less than 1/5, in particular 1/10, further in particular 1/20, of a largest width of the stack. This geometry restriction is advantageous to achieve a formed structure through the stamping or pressure forming process with very thin skin layers. For example, the form of a conus with a high ratio of depth to width will be difficult to achieve with a stamping process.

According to an exemplary embodiment, the material can be produced through a cold lamination process.

According to an exemplary embodiment, the material can be produced through a lamination process, in particular at a temperature higher than the melting point of the bonding layers and lower than the melting point of the core layer.

According to an exemplary embodiment, to facilitate the lamination process at lower temperatures, the thermoplastic bonding layer has a melting point lower than 210° C., in particular lower than 190° C., more in particular lower than 180° C.

According to an exemplary embodiment, the material can be produced with the application of a resin on one skin layer, adding the foam layer, covering of the resin with second skin layer, and the curing of the resin.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF EXEMPLARY EMBODIMENTS

Figure 1:
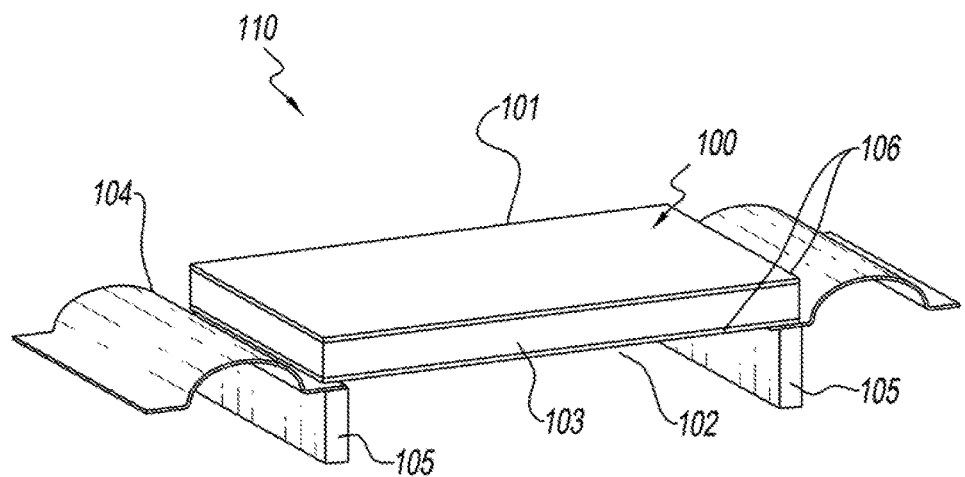
FIG. 1 shows a schematic view of a loudspeaker comprising a membrane plate structure according to an exemplary embodiment of the present invention, wherein the membrane plate structure comprises a flat shape.

The illustrations in the drawings are schematic. It is noted that in different figures similar or identical elements are provided with the same reference signs.

FIG. 1 shows a schematic view of a loudspeaker 110 comprising a membrane plate structure 100 according to an exemplary embodiment of the present invention. The loudspeaker 110 comprises a carrier element 104, a coil 105 as vibrating element which is coupled to the carrier element 104 and a membrane plate structure 100. The membrane plate structure 100 is supported by the carrier element 104 such that the membrane plate structure 100 is excitable by the coil 105 for generating sound waves.

The membrane plate structure 100 for generating sound waves comprises a first skin layer 101, a second skin layer 102, a foam core layer 103 which is interposed between the first skin layer 101 and the second skin layer 102, and two binding layers 106 between the foam core 103 and the respective skin layers 101, 102. At least one of the first skin layer 101 and the second skin layer 102 is coupled to vibrating element embodied as coil 105 for generating sound waves. The Young modulus of the core layer 103 is lower than the Young modulus of the first skin layer 101 and the second skin layer 102. The density of the first skin layer 101 and/or the second skin layer 102 is higher than the density of the core layer 103. The Young modulus and the shear modulus of the first skin layer 101, the second skin layer 102, the core layer 103 and the binding layers 106 are configured to not change or modify their respective value of the Young modulus and the shear modulus of more than 30% between a temperature of 20° C. and 150° C. In other words, neither the Young modulus nor the shear modulus will change its respective value by more than 30% in the event of a temperature change between 20° C. and 150° C. for the materials of the first skin layer 101, the second skin layer 102, the core layer 103 and the binding layers 106.

The coil 105 may be electrically excited by a control unit (not shown). The membrane plate structure 100 is coupled to the coil 105 such that the excited coil 105 excites the membrane plate structure 100 as well. The membrane plate structure 100 vibrates in an excited state and thereby generates acoustic sound.

The core layer 102 is formed with a lower Young modulus than the surrounding skin layers 101, 102. Hence, the membrane plates 101, 102 are stiffer than the core layer 103. This combination of layers generates efficient acoustic sound waves.

The membrane plate structure 100 according to the exemplary embodiment shown in FIG. 1 has a flat and uncurved design. The first skin layer 101, the second skin layer 102, the binding layers 106 and the core layer 103 form a stack extending within a plane. In other words, the membrane plate structure 100 has a flat, uncurved shape extending along the plane. More specifically, the first skin layer 100, the second skin layer 102, the binding layers 106 and the core layer 103 extend along respective planes having parallel plane normals.

Figure 2:
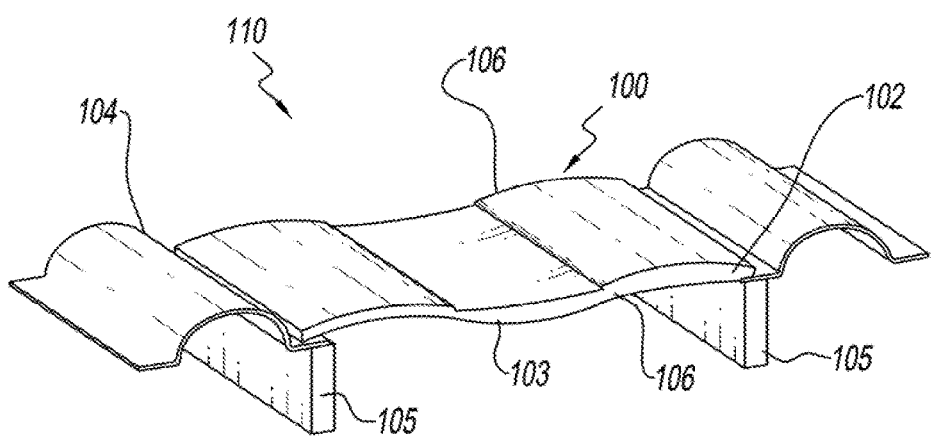
FIG. 2 shows a schematic view of a loudspeaker comprising a membrane plate structure according to another exemplary embodiment of the present invention, wherein the membrane plate structure comprises a wavelike shape.

FIG. 2 shows another exemplary embodiment of a loudspeaker 110 having corresponding features as the loudspeaker 110 shown in FIG. 1, except that the membrane plate structure 100 has a curved shape rather than being planar. In particular, the first skin layer 101, the second skin layer 102, the binding layers 106 and the core layer 103 form a stack having a curved, in particular wavelike, extension. In other words, the membrane plate structure 100 comprises a curved, wavelike structure and runs not within a plane.

Figure 3:
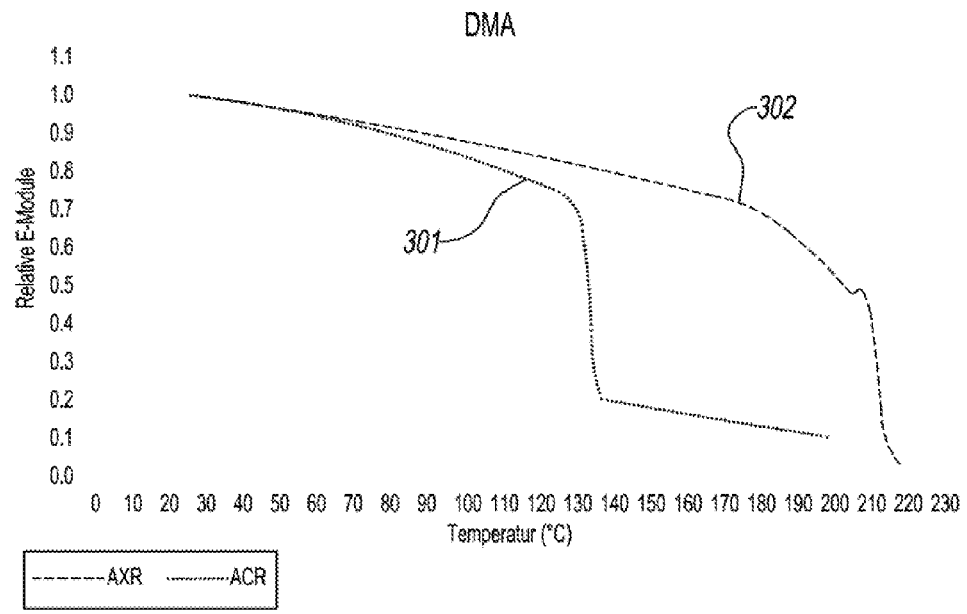
FIG. 3 shows a dynamic mechanical analysis (DMA) for a conventional membrane plate structure and for a membrane plate structure according to an exemplary embodiment of the present invention.

FIG. 3 shows a diagram of a dynamic mechanical analysis (DMA) representing a relative E-Module (i.e. Young module) change with respect to respective temperatures.

Line 301 shows an E-Module change with respect to respective temperatures of a conventional membrane (ACR). The component loses most of its shear modulus (e.g. E-Modulus) at a temperature of about 135° C. This means that if the speaker works at temperature higher than 135° C., the break-up frequency of the speaker will be strongly reduced.

Line 302 represents a membrane plate structure 100 according to an exemplary embodiment (AXR). The membrane plate structure 100 maintains the Young modulus up to 180° C. with a loss lower than 30% compared to the ambient temperature such as 20° C., allowing therefore the entire material to keep its bending modulus (e.g. relative E-Module) up to 180° C. with a loss lower than 30% compared to the ambient temperature's (around 20° C.) one. This property allows the speaker to reproduce the sound after some minutes of working almost as good as at ambient temperature. Thus, the membrane plate structure 100 according to an exemplary embodiment shows a pronounced temperature resistance or stability.

Figure 4:
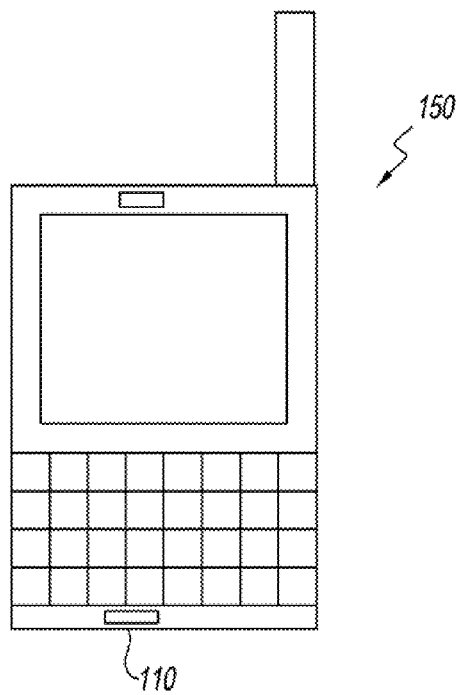
FIG. 4 shows a handheld device with a micro speaker having a membrane plate structure according to an exemplary embodiment of the present invention.

FIG. 4 shows a handheld device 150, which is here embodied as a mobile phone, with a micro speaker type loudspeaker 110 having a membrane plate structure 100 (not shown) according to an exemplary embodiment of the present invention. Advantageously, the handheld device 150 can be operated over a broad temperature range without deterioration of the loudspeaker's 110 sound quality.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 membrane plate
101 first skin layer
102 second skin layer
103 core layer
104 carrier element, membrane or surround
105 coil
106 binding layer
110 loudspeaker
150 handheld device

The invention claimed is:

1. A method of producing a membrane plate structure, wherein the method comprises:
   providing a first skin layer;
   providing a second skin layer;
   interposing a foam core layer between the first skin layer and the second skin layer;

arranging two binding layers between the foam core layer and the skin layers, wherein the first skin layer, the second skin layer, the binding layers, and the core layer form a stack, wherein at least one of the first skin layer and the second skin layer is configured to be coupled to a vibrating element for generating sound waves;

wherein the Young's modulus of the core layer is configured to be lower than the Young's modulus of the first skin layer and the second skin layer, wherein the density of at least one of the first skin layer and the second skin layer configured to be higher than the density of the core layer; and wherein the Young's modulus and the shear modulus of the first skin layer the second skin layer, the core layer and the binding layers are configured to change their value by not more than 30% between a temperature of 20° C. and 150° C., and wherein the binding layers are structured to provide stiffness to the stack.

2. The method of claim 1, wherein the two binding layers consist of a substantially similar material and wherein the two binding layers consist of a material selected from the group of materials consisting of a thermoplastic and an epoxy resin.

3. The method of claim 1, wherein the method comprises joining the first skin layer and the second skin layer, the core foam layer, and the binding layers through a warm lamination procedure, with the binding layers being thermoplastic layers.

4. The method of claim 3, wherein a melting temperature of the binding layers is lower than 180° C.

5. The method of claim 1, wherein arranging two binding layers between the foam core layer and the skin layers further comprises depositing resin on the first skin layer, adding the core layer, depositing resin on the core layer, covering the resin with the second skin layer, and curing the resin.

6. The method according to claim 1, wherein the method comprises adjusting a non-planar form of the membrane plate structure after fabrication of the stacked layers, as a first procedure, in a second procedure, through the use of one of a stamping process or a pressure forming process, in particular performed at a temperature between 0° C. and 200° C.

7. The method according to claim 1, wherein the first skin layer, the second skin layer, the binding layers, and the foam core layer form a stack having a bending modulus greater than 10 GPa.

8. A method of producing a membrane plate structure, wherein the method comprises:

providing a first skin layer;

providing a second skin layer, wherein at least one of the first skin layer and the second skin layer is configured to be coupled to a vibrating element for generating sound waves;

disposing a foam core layer between the first skin layer and the second skin layer, wherein the Young's modulus of the core layer is lower than the Young's modulus of the first skin layer and the second skin layer, and wherein the density of at least one of the first skin layer and the second skin layer is higher than the density of the foam core layer; and arranging binding layers between the foam core layer and the skin layers such that a stack is formed thereby, wherein the Young's modulus of the first skin layer, the second skin layer, the core layer, and the binding layers are configured to change their value by not more than 30% between a temperature of 20° C. and 150° C., wherein a bending modulus of the stack is greater than 10 GPa, wherein the two binding layers are constructed of a substantially similar material, and wherein the two binding layers, as integrated into the stack, increase the stiffness of the stack.

* * * * *